(12) United States Patent
Shaw et al.

(10) Patent No.: US 8,987,363 B2
(45) Date of Patent: Mar. 24, 2015

(54) NARROW PARTICLE SIZE DISTRIBUTION CALCIUM CARBONATE AND METHODS OF MAKING SAME

(75) Inventors: Lane George Shaw, Milton, GA (US); Gary Lee Hillebrenner, Quincy, IL (US)

(73) Assignee: J.M. Huber Corporation, Atlanta, GA (US)

( * ) Notice: Subject to any disclaimer, the term of this patent is extended or adjusted under 35 U.S.C. 154(b) by 67 days.

(21) Appl. No.: 13/424,718

(22) Filed: Mar. 20, 2012

(65) Prior Publication Data

US 2012/0264865 A1 Oct. 18, 2012

Related U.S. Application Data

(60) Provisional application No. 61/474,357, filed on Apr. 12, 2011.

(51) Int. Cl.
| | |
|---|---|
| *C08K 3/26* | (2006.01) |
| *C01F 11/18* | (2006.01) |
| *C09C 1/02* | (2006.01) |
| *C09C 3/04* | (2006.01) |

(52) U.S. Cl.
CPC ............ *C01F 11/185* (2013.01); *C09C 1/021* (2013.01); *C09C 3/041* (2013.01); *C08K 3/26* (2013.01); *C01P 2004/51* (2013.01); *C01P 2004/52* (2013.01); *C01P 2004/61* (2013.01)
USPC .......... 524/425; 106/463; 106/464; 106/465; 428/35.2; 428/35.5; 428/304.4; 428/312.8; 428/330; 428/402; 428/403; 428/500; 524/426; 524/427

(58) Field of Classification Search
CPC ........ B29C 55/005; B29C 55/02; B29D 7/01; B29K 2021/003; B29K 2023/06; B29K 2995/0065; B29K 2995/0068; B32B 3/00; B32B 3/26; B32B 5/16; B32B 27/00; B32B 27/08; B32B 27/20; B32B 27/205; C01F 11/185; C01P 2004/51; C01P 2004/52; C01P 2004/61; C08J 3/20; C08J 5/18; C08K 3/0033; C08K 3/26; C08L 2666/54; C08L 2666/72; C09C 1/021; C09C 3/041; C09C 3/08
USPC ................ 106/463, 464, 465; 428/35.2, 35.5, 428/304.4, 312.8, 330, 402, 403, 500; 524/425, 426, 427

See application file for complete search history.

(56) References Cited

U.S. PATENT DOCUMENTS

| | | | |
|---|---|---|---|
| 4,444,921 A | 4/1984 | South, Jr. | |
| 4,767,464 A | 8/1988 | Strauch et al. | |
| 5,695,868 A | 12/1997 | McCormack | |
| 7,060,746 B2 * | 6/2006 | Calhoun et al. | 524/425 |
| 7,070,134 B1 | 7/2006 | Hoyer | |
| 7,794,737 B2 * | 9/2010 | Fish et al. | 424/400 |
| 2002/0155055 A1 | 10/2002 | Denholm et al. | |
| 2009/0324979 A1 * | 12/2009 | Roussel et al. | 428/523 |
| 2010/0041811 A1 * | 2/2010 | Gane et al. | 524/427 |

FOREIGN PATENT DOCUMENTS

| | | | | |
|---|---|---|---|---|
| EP | 1980588 A1 * | 10/2008 | | C08K 9/04 |
| WO | WO-2011/028934 A1 | 3/2011 | | |

OTHER PUBLICATIONS

International Search Report and Written Opinion issued on Jul. 4, 2012 for Intl. App. No. PCT/US2012/032454, filed Apr. 6, 2012 (Applicant—J.M. Huber Corporation; pp. 1-9).

\* cited by examiner

*Primary Examiner* — Anthony J Green

(74) *Attorney, Agent, or Firm* — Merchant & Gould

(57) ABSTRACT

Calcium carbonate particles having very narrow particle sizes with a controlled $D_{98}$ and minimal ultrafines (very small particles) are described. The particles are prepared by grinding a feedstock in a centrifugal grinding mill, which utilizes very high centrifugal forces to impact the particles with each other or grinding media.

30 Claims, 2 Drawing Sheets

US 8,987,363 B2

NARROW PARTICLE SIZE DISTRIBUTION CALCIUM CARBONATE AND METHODS OF MAKING SAME

CROSS REFERENCE TO RELATED APPLICATIONS

This application claims priority to U.S. Provisional Patent Application No. 61/474,357, filed on Apr. 12, 2011, which is hereby incorporated by reference in its entirety.

BACKGROUND

Technical Field

Alkaline earth metal carbonates, such as calcium carbonates, are used as particulate fillers in products that contain thermoplastic polymers, such as film products. Such films, porous or non-porous, are manufactured for a number of consumer products such as garbage bags, backing materials, masking films, labeling, plastic paper, house wrap, roofing membranes, grocery sacks, diapers, bandages, training pants, sanitary napkins, surgical drapes, and surgical gowns.

When alkaline earth metal carbonates are processed with thermoplastic polymer products, cavitation, or the formation of voids or air pockets, can occur around particles of a certain diameter (typically 1 to 3 microns) upon stretching or orientation. These formed micro-pockets of air can either scatter light in films, such as polypropylene or copolymer films, creating a pearlescent appearance, or can create microvoid passageways for moisture.

Because of cavitation and other effects that occur when carbonate fillers and polymer compositions are processed, physical properties of the alkaline earth metal carbonate fillers, particular particle size properties, can impact the performance and appearance of end products that contain the filler. Ultrafines, for example, which are very small particles, cannot properly undergo cavitation and typically only add undesirable weight to the final product. Very small particles can also cause filler agglomeration due to inter-particle attraction forces. Larger particles (e.g., particles greater than 10 microns in diameter) and agglomerates tend to tear polymer films. Additionally, if the average particle size of the filler is too small, the filler may not effectively debond from the polymer and microvoids may not form at all.

As alkaline earth metal carbonates, particularly calcium carbonates, are difficult to prepare with controlled and narrow particle size distributions, a need remains for improved methods to achieve this goal. These needs and other needs are satisfied by the present invention.

SUMMARY

Disclosed herein are calcium carbonate ($CaCO_3$) particles having a median particle size ($D_{50}$) of from 1 to 3 microns; wherein the ratio of the median particle size ($D_{50}$) to the size corresponding to 98% of the cumulative weight fraction of the particles ($D_{98}$), $D_{50}:D_{98}$, is at least 36:100.

Also disclosed herein are methods for alkaline earth metal carbonate particles, comprising: grinding an alkaline earth metal carbonate feedstock in a centrifugal grinding mill to produce ground alkaline earth metal carbonate particles having a median particle size ($D_{50}$) of from 1 to 3 microns; wherein the ratio of the median particle size ($D_{50}$) to the size corresponding to 98% of the cumulative weight fraction of the particles ($D_{98}$), $D_{50}:D_{98}$, is at least 36:100; and wherein the alkaline earth metal carbonate feedstock is of sedimentary origin.

Also disclosed herein are films comprising the calcium carbonate particles of the invention.

DETAILED DESCRIPTION

Figure 1:
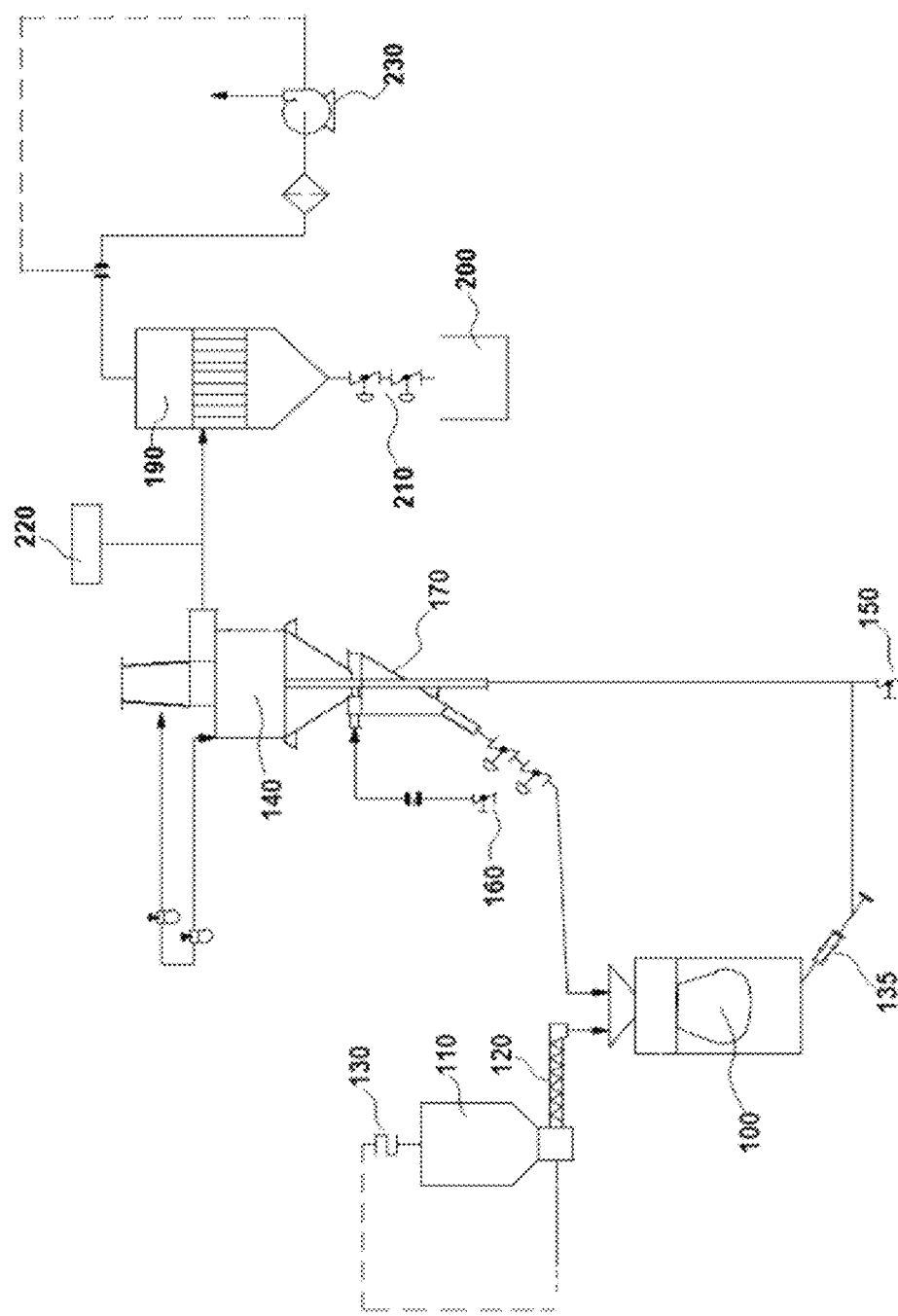
FIG. 1 is a schematic diagram of the centrifugal grinding mill system used to prepare the calcium carbonate particles disclosed herein.
Figure 2:
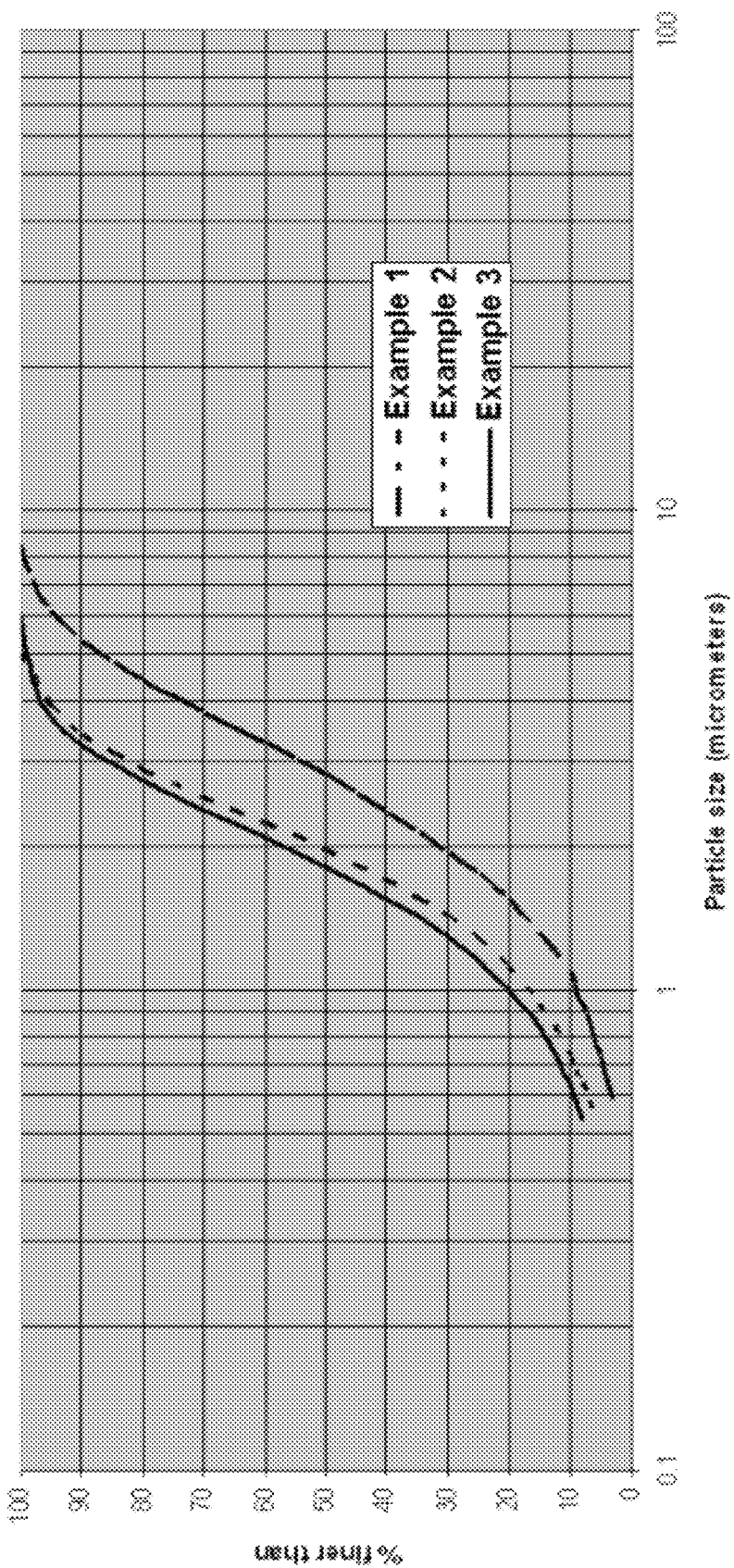
FIG. 2 is a plot of % by weight vs. particle size for Examples 1-3.

The calcium carbonate particles of the invention have very narrow particle sizes with a controlled $D_{98}$ and minimal ultrafines (very small particles). The particles are prepared by grinding alkaline earth metal carbonates, preferentially micritic calcium carbonate in a centrifugal grinding mill, which utilizes very high centrifugal forces to impact the particles with each other or grinding media. This type of impact has a tendency to split the particles rather than cleave the outer edges of particles, which typically occurs in roller mills, ball mills, hammer mills, and vertical stirred media mills.

The calcium carbonate particles of the invention are useful for a variety of applications, including without limitation extruded filled cast films, such as those present in baby diapers, feminine hygiene products, surgical gowns, and environmental clean up suits, among others.

The calcium carbonate particles of the invention have a $D_{50}$ (also known as median particle size) of from 1 to 3 microns, where $D_{50}$ is the particle size value less than which there are 50% by weight of the particles; and a $D_{50}:D_{98}$ ratio of at least 36:100 (e.g., from 36:100 to 50:100), where $D_{98}$ is the particle size value less than which there are 98% by weight of the particles, where $D_{50}$ is defined above; and preferably a $D_{50}:D_{98}$ ratio of at least 40:100 (e.g., from 40:100 to 45:100).

The calcium carbonate particles can also have one or more of the following particle size properties:

i. at least 55% by weight (e.g., from 55% to 70%) of the particles have a size of from 1 to 3 microns, preferably at least 60% (e.g., from 55% to 70%) by weight of the particles have a size of from 1 to 3 microns, and more preferably at least 65% (e.g., from 65% to 70%) by weight of the particles have a size of from 1 to 3 microns, ii. a $D_{20}$ of from 0.8 to 1.2 microns, where $D_{20}$ is the particle size value less than which there are 20% by weight of the particles; and preferably a $D_{20}$ of from 0.9 to 1.0 microns, and/or iii. no more than 10% by weight of the particles has a size smaller than 0.5 microns, preferably no more than 8% of the particles by weight has a size smaller than 0.5 microns.

All particle size values as specified herein are measured by the well known conventional method employed in the art of sedimentation of the particles in a fully dispersed state in an aqueous medium using a SEDIGRAPH 5100 machine as supplied by Micromeritics Instrument Corporation, Norcross, Ga., USA.

The calcium carbonate particles of the invention can optionally be coated with an aliphatic carboxylic acid having at least 10 carbon atoms. The aliphatic carboxylic acid can constitutes from 0.5% to 1.5% by weight of the particles (including the weight of the coating itself, i.e., the total weight). Aliphatic carboxylic acids that can be used include without limitation stearic acid, palmitic acid, behenic acid, montanic acid, capric acid, lauric acid, myristic acid, isostearic acid, a cerotic acid, or a mixture thereof.

The calcium carbonate particles are prepared from high purity alkaline earth metal carbonate, preferably calcium carbonate, which is preferably of sedimentary origin. Certain calcium carbonates are almost chalk-like, very soft, and break readily into fine particles. Calcium carbonates which are of sedimentary origin include reef limestone, which includes reef-existing fossil fragments; betrital limestone, which includes fibrous skeletal and non-skeletal grains, including pelloids, ooids, and infraclasts; micrite, which is a naturally precipitated calcium carbonate which forms into beds or is found in a matrix with betrital limestones; and chalk, which includes disarticulated caccolith fragments.

The calcium carbonate is preferably micritic limestone, which exists as combinations of all of the above types, i.e. reefs, betritals, micrites, and chalk. Micritic limestone is very pure with some deposits having calcium carbonate contents in excess of 98% and generally contains no alpha quartz.

Micritic limestone can be found throughout the Caribbean basin with significant deposits on the islands of the Bahamas, Haiti/Dominican Republic and Jamaica. Other high purity micritic limestone deposits exist in Southern France, an example of which is the Orgon deposit. Other deposits, both known and unknown, exist around the world.

Alkaline earth metal carbonate feedstock, such as calcium carbonate feedstock, can first be crushed into a nuggets (e.g., nuggets of approximately 2 inches in diameter) to obtain an easily workable crude feedstock. After crushing, the feedstock will generally contain about 14% by weight moisture. The feedstock is preferably at least 95% pure calcium carbonate, and more preferably at least 98% pure calcium carbonate. The feedstock can in certain instances be ground prior to being fed into the centrifugal grinding mill. This intermediate grinding step can be performed, for example, using a roller, ball, or hammer mill. The feedstock can be ground to any particular size, for example, about 6 microns or less.

The calcium carbonate feedstock can either be ground in the presence of water (wet grind) or in the absence of water (dry grind). Referring now to FIG. 1, feedstock is transported to the centrifugal grinding mill 100 from feed hopper 110 using a screw feeder 120. The rate at which feedstock is fed into the grinding mill 100 from the feed hopper 110 is calculated from loss-in-weight measurements taken from a load cell 130 connected to the feed hopper 110. The feed-rate can be controlled using a variable speed drive connected to the screw feeder 120. A pebble-trap 135 can be installed below grinding mill 100.

The aliphatic carboxylic acid discussed above can optionally be introduced into grinding mill 100 in the melt, or can be applied to the particles after grinding. The preferred method is to treat as the feedstock with the aliphatic carboxylic acid as it is being ground, when the surface energy of freshly fractured particles is high. This facilitates the reaction of the organic acid with the particle surface and limits the amount of free stearic acid in the final product. Free stearic acid is detrimental to film processors and can cause plate out, die lip drool, and readily volatilizes to produce smoke. Free stearic acid can also lead to heat sealing difficulties.

The centrifugal grinding mill 100 includes a motor (not shown) which is controlled by a variable speed drive. The mill motor can be operated at discrete speeds of 760 and 960 revolutions-per-minute (RPM), corresponding to a maximum chamber acceleration of 30 and 50 G respectively. The mill drive lubrication system is monitored and controlled by a programmable logic control (PLC). Feedstock is ground in mill 100 and then pneumatically conveyed to classifier 140.

Since the air flow required for effective pneumatic transport is less than what is required for effective classification, additional air is draw into the system through primary air valve 150. The setting of the primary air valve 150 and secondary air valve 160 also controls the differential pressure across the mill, i.e., the mill vacuum.

Oversized particles and agglomerates are rejected by classifier 140 and fall by gravity down oversize chute 170 for re-grinding in mill 100. Classifier 140 is operated by a variable speed drive which allows the rotor speed to be set to achieve a particular product top size cut ($D_{98}$). Compressed air is used to seal both the classifier 140 and rotor bearings. The classifier oversize return chute 170 is sealed by a double-butterfly valve air lock system 180. Secondary air flow to classifier 140 is manually adjusted using the butterfly valve system 180 and monitored by an orifice-plate flow meter.

Air and product are pneumatically conveyed from classifier 140 to dust collector 190 where product is collected in a drum or bulker bag 200. Dust collector 190 is sealed by a double-butterfly valve air lock system 210.

A particle analyzer (e.g., an INSITEC analyzer) 220 can be installed on the classifier fine-product line between classifier 140 and dust collector 190 to provide instant feedback on classifier performance.

Two blowers are operated in parallel to generate system air flow. System blower 2 (not shown) is run at full speed, and system blower 1 230 is operated by a variable speed drive to provide trim control on system air flow-rate in closed-loop feedback with an orifice-plate flow meter (not shown) downstream of dust collector 190. The total system air capability is approximately 1600 m³/hr at −20 KPa using both blowers.

Instrumentation is incorporated into the system for monitoring critical process and mill control parameters. Mill power draw is determined from a direct reading of the Mill variable speed drive. A microwave mass-flow indicator (not shown) can be installed on the classifier feed (mill 100 discharge) to provide feedback as to whether the system is at steady state.

The grinding chamber of mill 100 has a nominal volume of 10.7 L. Forty mm discharge ports (not shown) are positioned at the circle within the chamber of maximum diameter. Grates (not shown) are placed over the discharge ports to retain media inside the grinding chamber. Grate slot width is generally selected to be at least one-half the diameter of the smallest media particle used. A more detailed discussion of centrifugal grinding mills, such as grinding mill 100, is provided in U.S. Pat. No. 7,070,134, to Hoyer, which is incorporated herein by reference for its teaching of centrifugal grinding mills.

Also disclosed herein are films including a thermoplastic polymeric material together with a filler, wherein the filler comprises partly or wholly the calcium carbonate particles defined above. The thermoplastic polymer can form from 20% to 70% by weight of the film, and the filler can form from 30% to 80% by weight of the film, i.e., combination of the polymer plus filler. In some examples, the thermoplastic polymer forms from about 35% to about 55% by weight of the composition and the filler forms from about 45% to about 65% by weight of the composition.

Thermoplastic polymers that can be used include polyolefin resins, such as mono-olefin polymers of ethylene, propylene, butene or the like, or copolymers thereof as a main component. Typical examples of the polyolefin resin include polyethylene resins such as a low-density polyethylene, linear low-density polyethylene (ethylene-a-olefin copolymer), middle-density polyethylene and high-density polyethylene; polypropylene resins such as polypropylene and ethylene-polypropylene copolymer; poly(4-methylpentene); polybutene; ethylene-vinyl acetate copolymer; and mixtures thereof. These polyolefin resins may be obtained by polymerization in a known way, e.g., by the use of a Ziegler catalyst, or obtained by the use of a single site catalyst such as a metallocene catalyst. In view of the moldability, the stretchability and the like of the film, the melt index of the polyolefin resin is preferably in the range of about 0.5 to 5 g/10 min.

Examples of the other fillers (aside from the calcium carbonate particles of the invention) that can be included in the films include calcium carbonate (produced not in accordance with the invention), barium sulphate, calcium sulphate, barium carbonate, magnesium hydroxide, aluminum hydroxide, zinc oxide, calcium oxide, magnesium oxide, titanium oxide, silica and talc. The average particle diameter of the other filler is preferably 20 microns or less, preferably 10 microns, preferably in the range of 0.5 to 5 microns. In order to improve the dispersibility of the other filler in the film, the other filler may be subjected to a surface treatment to render its surfaces hydrophobic, as discussed above, may be used. Examples of suitable surface treatment agents include the fatty acids such as stearic acid, specified earlier.

The composition ratio between the thermoplastic polymeric material, e.g., polyolefin resin and the filler has an influence on the moldability and the stretchability of the film as well as the breathability and the moisture vapor transmission of the obtained film. If the amount of the filler is insufficient, adjacent micropores, which are required to be obtained by the interfacial separation of the polyolefin resin and the inorganic filler from each other, are not continuous, so that a porous film having the good gas breathability and moisture vapor transmission cannot be obtained. On the contrary, if the amount of the filler is excessive, defective molding occurs during the film forming process and the stretchability deteriorates, so that the sufficient stretching cannot be carried out. In view of these factors, the composition ratio between the polyolefin resin and the inorganic filler may be from 25 to 70 parts by weight of the polyolefin resin with respect to from 75 to 30 parts by weight of the filler, e.g., from 30 to 60 parts by weight of the polyolefin resin with respect to 70 to 40 parts by weight of the filler.

In the manufacture of a breathable film, a concentrate or masterbatch of the thermoplastic polyolefin resin and the filler, including the particulate product according to the present invention, may first be produced by mixing and compounding prior to the film production stages.

The mixture of ingredients to be blended by compounding may include in addition to the resin and the filler other known optional ingredients employed in thermoplastic films, e.g., one or more of bonding agents, plasticisers, lubricants, antioxidants, ultraviolet absorbers, dyes, colorants. A bonding or tackifying agent, where employed, may facilitate bonding of the film after formation to another member, e.g., a non-woven fibrous layer, or one or more non-porous layers.

The polyolefin resin, the filler and if necessary, other optional additives, may be mixed by the use of a suitable compounder/mixer e.g., a Henschel mixer, a super mixer, a tumbler type mixer or the like, and kneaded and may be pelletized, e.g., by the use of a single screw extruder or a twin-screw extruder which forms strands which may be cut or broken into pellets.

The masterbatch or concentrate, e.g., in the form of pellets, is melted and molded or shaped into a film by the use of a known molding and film forming machine.

The film may be a blown film, cast film or extruded film. Other types of films are also considered to be within the scope of the present invention provided the forming technique is compatible with filled films. Appropriate methods for producing the films according to the present invention will be readily apparent to the skilled artisan. The film as initially formed may be too thick and may not yet have a sufficient degree of breathability as measured by its water vapor transmission rate. Consequently, the film may be heated, e.g., to a temperature of about 5° C. less than about the melting point of the thermoplastic polymer or more, and then stretched to at least about 1.2 times, preferably at least 2.5 times, its original length to thin the film and render it porous.

An additional feature of the thinning process is the change in opacity of the film. As formed, the film is relatively transparent but after stretching, it becomes opaque. In addition, while the film becomes orientated during the stretching process, it also becomes softer. Taking all these factors into consideration, and the desire to have a water vapor transmission rate of at least 100 grams per square meter per 24 hours, the film may, for example, be thinned to such an extent that it has a weight per unit area of less than about 35 grams per square meter for personal care absorbent article applications and a weight per unit area of less than about 18 grams per square meter for certain other applications.

The molding and film forming machine may for example comprise, as in the prior art, an extruder equipped with a T-die or the like or an inflation molding machine equipped with a circular die. The film production may be carried out at some time after the masterbatch production, possibly at a different manufacturing plant. In some cases, the masterbatch can directly be formed into the film without producing an intermediate product, e.g., by pelletizing.

The film can be stretched in at least a uniaxial direction at a temperature of from room temperature to the softening point of the resin in a known manner such as a roll method, an interdigitizing method, or a tenter method to bring about the interfacial separation of the polymer and the inorganic filler from each other, whereby a porous film can be prepared. The stretching may be carried out by one step or by several steps. Stretch magnification determines film breakage at high stretching as well as breathability and the moisture vapor transmission of the obtained film, and so excessively high stretch magnification and excessively low stretch magnification are desirably avoided. The stretch magnification is preferably in the range of 1.2 to 5 times, more preferably 1.2 to 4 times in at least a uniaxial direction. If biaxial stretching is carried out, it is possible that for example stretching in a first direction is applied in the machine direction or a direction perpendicular thereto, and stretching in a second direction is then applied at right angles to the first direction. Alternatively, the biaxial stretching may be carried out simultaneously in the machine direction and the direction perpendicular thereto. Any method known in the art or after developed can be applied in making the film in the method according to this aspect of the present invention.

After the stretching, a heat setting treatment may be carried out if required in order to stabilize the shape of obtained voids. The heat setting treatment may be, for example, a heat setting treatment at a temperature in the range of from the softening point of the resin to a temperature less than about the melting point of the resin for a period of 0.1 to 100 seconds.

No particular restriction is put on the thickness of the films disclosed herein. The thickness should be such as to obtain film unlikely to tear or break and which has appropriate softness and good feel. Usually, the thickness of the film is in the range of 5 microns to 100 microns.

For purposes of the present invention, a film is "breathable" if it has a water vapor transmission rate of at least 100 g/m$^2$/24 hours as calculated using the test method described in U.S. Pat. No. 5,695,868. In one aspect, the water vapor transmission rate (WVTR) of a sample can be calculated in accordance with ASTM Standard E96-80. In such an aspect, circular samples measuring three inches in diameter can be cut from each of the test materials and a control material. Multiple, for example, five, samples can be prepared for each material. In addition, a test dish, such as a number 60-1 Vapometer pan distributed by Thwing-Albert Instrument Company of Philadelphia, Pa., can be used. In the test, one hundred milliliters of water can be poured into each Vapometer pan and individual samples of the test materials and control material can be placed across the open tops of the individual pans. Screw-on flanges can be tightened to form a seal along the edges of the pan, leaving the associated test material or control material exposed to the ambient atmosphere over a 6.5 centimeter diameter circle having an exposed area of approximately 33.17 square centimeters. The pans can be placed in a forced air oven at 100° F. (32° C.) for 1 hour to equilibrate. The oven can be a constant temperature oven with external air circulating through it to prevent water vapor accumulation inside. A suitable forced air oven is, for example, a Blue M Power-O-Matic 60 oven distributed by Blue M Electric Company of Blue Island, Ill. Upon completion of the equilibration, the pans can be removed from the oven, weighed and immediately returned to the oven. After 24 hours, the pans can be removed from the oven and weighed again. The preliminary test water vapor transmission rate values can then be calculated based on the weight loss over the 24 hour period. Under predetermined set conditions of 100° F. (32° C.) and ambient relative humidity, the WVTR for the control material can be determined. The control sample can then be run with each test and the preliminary test values corrected to set conditions accordingly.

Generally, once the film is formed, it will have a weight per unit area of less than about 100 grams per square meter and after stretching and thinning its weight per unit area will be less than about 35 grams per square meter and more desirably less than about 18 grams per square meter.

The film can be suitably utilized in applications requiring softness, for example, as the backing sheet of disposable diapers. "Porous" as used in the present application includes but is not coextensive with "breathable" films. No particular restriction is put on the lower limit of the softness, but it is usually about 20 mm.

The porous film prepared by the method according to the present invention having such properties may have a suitable breathability, moisture vapor transmission and feeling as well as excellent mechanical properties and long-term adhesives properties. Therefore, the porous film can be suitably used in products such as disposable diapers, body fluid absorbing pads and bed sheets; medical materials such as surgical gowns and base materials for hot compress; clothing materials such as jumpers, rainwear; building materials such as wallpapers and waterproof materials for roofs and house wraps; packaging materials for packaging desiccants, dehumidifying agents, deoxidizers, insecticides, disposable body warmers; packaging materials for keeping the freshness of various articles and foods; separators for the cells; and the like. The porous film is particularly desirable as a material used in products such as disposable diapers and body fluid absorbing pads. The porous film may in such products be formed into a composite or laminate in one of the ways well known in the art with one or more other layers, e.g., a nonwoven fibrous layer, e.g., by an adhesive or bonding agent.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Examples 1-3 discussed below were prepared using a HICOM 25 centrifugal grinding mill configured into the system described with reference to FIG. 1. The grinding media in the centrifugal grinding mill was ZIRCONOX Ce-TPZ ceramic media (Jyoti, India). The particle classifier used was a COMMEX ACX 200 classifier. The dust collector used was a TORIT-DCE DLM V20/12B Dalamatic dust collector. An INSETIC online particle analyzer was used between the classifier and the dust collector. System 2 blower was a REITSCHLE SAP1500, run at full speed, and system 1 blower was a GAST R93150A, operated with a variable speed drive. Critical process and control parameters were recorded on a SCADA system.

For preparing coated calcium carbonate particles, stearic acid was chosen as the aliphatic carboxylic acid. Stearic acid flakes (SYMEX #4989, Symex Holdings, Melbourne) were melted in a heated reservoir maintained at 70-80° C. The melted stearic acid was then dosed directly (drop-wise) into a feed tube connected to the HICOM mill and through a heat-traced stainless steel tube using a ZENITH gear pump with DC speed control.

A Sedigraph particle size analyzer was used to measure particle size and particle size distribution. Any surface coating was first removed, and the material was slurried in water and analyzed at 35° C. Each sample was measured from 0.5 to 50 microns.

Example 1

VertiCal 3

TABLE 1

Sedigraph product sizing data for Example 1.

| Particle Diameter (μm) | Cumulative Finer Mass (%) |
|---|---|
| 10 | 100 |
| 7.15 | 98 |
| 6.16 | 95 |
| 5.33 | 90 |
| 4.81 | 85 |
| 4.41 | 80 |
| 4.08 | 75 |
| 3.79 | 70 |
| 3.53 | 65 |
| 3.27 | 60 |
| 3.03 | 55 |
| 2.8 | 50 |
| 2.57 | 45 |
| 2.35 | 40 |
| 2.15 | 35 |
| 1.94 | 30 |
| 1.74 | 25 |
| 1.54 | 20 |
| 1.32 | 15 |
| 1.05 | 10 |
| 0.99 | 9 |
| 0.93 | 8 |
| 0.86 | 7 |

TABLE 1-continued

Sedigraph product sizing data for Example 1.

| Particle Diameter (μm) | Cumulative Finer Mass (%) |
|---|---|
| 0.79 | 6 |
| 0.73 | 5 |
| 0.66 | 4 |
| 0.59 | 3 |

Example 2

VertiCal 2 SM

TABLE 2

Sedigraph product sizing data for Example 2.

| Particle Diameter (μm) | Cumulative Finer Mass (%) |
|---|---|
| 10.00 | 100 |
| 4.52 | 98 |
| 3.90 | 95 |
| 3.42 | 90 |
| 3.11 | 85 |
| 2.88 | 80 |
| 2.69 | 75 |
| 2.52 | 70 |
| 2.37 | 65 |
| 2.22 | 60 |
| 2.09 | 55 |
| 1.96 | 50 |
| 1.82 | 45 |
| 1.69 | 40 |
| 1.55 | 35 |
| 1.42 | 30 |
| 1.27 | 25 |
| 1.12 | 20 |
| 0.93 | 15 |
| 0.73 | 10 |
| 0.68 | 9 |
| 0.64 | 8 |
| 0.59 | 7 |
| 0.54 | 6 |

Example 3

VertiCal 2 LM

TABLE 3

Sedigraph product sizing data for Example 3.

| Particle Diameter (μm) | Cumulative Finer Mass (%) |
|---|---|
| 10.00 | 100 |
| 4.42 | 98 |
| 3.71 | 95 |
| 3.24 | 90 |
| 2.95 | 85 |
| 2.72 | 80 |
| 2.53 | 75 |
| 2.37 | 70 |
| 2.22 | 65 |
| 2.07 | 60 |
| 1.94 | 55 |
| 1.81 | 50 |
| 1.68 | 45 |
| 1.55 | 40 |
| 1.42 | 35 |
| 1.29 | 30 |
| 1.15 | 25 |
| 1.00 | 20 |
| 0.84 | 15 |
| 0.63 | 10 |
| 0.59 | 9 |
| 0.54 | 8 |

Various modifications and variations can be made to the compounds, composites, kits, articles, devices, compositions, and methods described herein. Other aspects of the compounds, composites, kits, articles, devices, compositions, and methods described herein will be apparent from consideration of the specification and practice of the compounds, composites, kits, articles, devices, compositions, and methods disclosed herein. It is intended that the specification and examples be considered as exemplary.

What is claimed is:

1. A breathable film comprising a thermoplastic polymer and calcium carbonate ($CaCO_3$) particles having a median particle size ($D_{50}$) of from 1 to 3 microns; wherein the ratio of $D_{50}$ to $D_{98}$, $D_{50}:D_{98}$, is at least 36:100, wherein no more than 10% of the particles by weight have a size smaller than 0.5 microns, and wherein the breathable film has a weight per unit area of less than about 35 g/m².

2. The breathable film of claim 1, wherein the calcium carbonate particles are prepared from calcium carbonate feedstock of sedimentary origin.

3. The breathable film of claim 1, wherein the calcium carbonate particles are prepared from micritic limestone comprising at least 95% calcium carbonate ($CaCO_3$).

4. The breathable film of claim 1, wherein $D_{50}:D_{98}$ is at least 40:100.

5. The breathable film of claim 1, wherein at least 55% by weight of the particles have a size of from 1 to 3 microns.

6. The breathable film of claim 1, wherein $D_{20}$ is from 0.8 to 1.2 microns.

7. The breathable film of claim 1, wherein at least a portion of the particles are coated with an aliphatic carboxylic acid having at least 10 carbon atoms.

8. The breathable film of claim 7, wherein the aliphatic carboxylic acid constitutes from 0.5% to 1.5% by weight of the particles.

9. The breathable film of claim 1, wherein at least a portion of the particles are coated with an aliphatic carboxylic acid comprising stearic acid, palmitic acid, behenic acid, montanic acid, capric acid, lauric acid, myristic acid, isostearic acid, a cerotic acid, or a mixture thereof.

10. The breathable film of claim 1, wherein the thermoplastic polymer comprises a polyolefin resin or a copolymer thereof.

11. The breathable film of claim 1, wherein the thermoplastic polymer comprises from about 20 wt. % to about 70 wt. % of the film, and wherein the calcium carbonate particles comprise from about 30 wt. % to about 80 wt. % of the film.

12. The breathable film of claim 1, wherein the thermoplastic polymer has a melt index of from about 0.5 g/10 min to about 5 g/10 min.

13. The breathable film of claim 1, having a water vapor transmission rate of at least about 100 g/m² per 24 hours.

14. A method for preparing a breathable film, the method comprising: grinding an alkaline earth metal carbonate feedstock in a centrifugal grinding mill to produce ground alkaline earth metal carbonate particles having a median particle size ($D_{50}$) of from 1 to 3 microns; wherein the ratio of $D_{50}$ to $D_{98}$, $D_{50}:D_{98}$, is at least 36:100; wherein no more than 10% of the particles by weight have a size smaller than 0.5 microns; and wherein the alkaline earth metal carbonate feedstock is of sedimentary origin, contacting the alkaline earth metal carbonate particles with a thermoplastic polymer to form a mixture, producing a web from the mixture, and stretching the web to prepare the breathable film having a weight per unit area of less than 35 g/m$^2$.

15. The method of claim 14, wherein the alkaline earth metal carbonate feedstock is calcium carbonate ($CaCO_3$).

16. The method of claim 14, wherein grinding comprises pneumatically conveying initially ground particles into a size classifier and subsequently re-grinding any particles rejected by the size classifier in the centrifugal grinding mill.

17. The method of claim 14, further comprising coating the feedstock with an aliphatic carboxylic acid while the feedstock is being ground in the centrifugal grinding mill.

18. The method of claim 14, further comprising coating the feedstock with an aliphatic carboxylic acid comprising stearic acid, palmitic acid, behenic acid, montanic acid, capric acid, lauric acid, myristic acid, isostearic acid, cerotic acids, or a mixture thereof, while the feedstock is being ground in the centrifugal grinding mill.

19. The method of claim 14, wherein the feedstock is micritic limestone comprising at least 95% calcium carbonate ($CaCO_3$).

20. The method of claim 14, wherein at least 55% by weight of the ground particles have a size of from 1 to 3 microns.

21. The method of claim 14, wherein $D_{20}$ is from 0.8 to 1.2 microns.

22. A breathable film comprising a thermoplastic polymer and calcium carbonate ($CaCO_3$) particles, wherein:
  the breathable film is characterized by:
    a weight per unit area of less than about 35 g/m$^2$, and
    a water vapor transmission rate of at least about 100 g/m$^2$ per 24 hours; and
  the calcium carbonate ($CaCO_3$) particles are characterized by:
    a median particle size ($D_{50}$) of from 1 to 3 microns,
    a ratio of $D_{50}$ to $D_{98}$, $D_{50}:D_{98}$, of at least 36:100, and
    a $D_{20}$ of from 0.8 to 1.2 microns; and
  wherein at least 55% by weight of the particles have a size of from 1 to 3 microns, and no more than 10% of the particles by weight have a size smaller than 0.5 microns.

23. The breathable film of claim 22, wherein at least a portion of the particles are coated with an aliphatic carboxylic acid comprising stearic acid, palmitic acid, behenic acid, montanic acid, capric acid, lauric acid, myristic acid, isostearic acid, a cerotic acid, or a mixture thereof.

24. A breathable film comprising a thermoplastic polymer and calcium carbonate ($CaCO_3$) particles having a median particle size ($D_{50}$) of from 1 to 3 microns; wherein the ratio of $D_{50}$ to $D_{98}$, $D_{50}:D_{98}$, is at least 36:100, wherein at least 55% by weight of the particles have a size of from 1 to 3 microns, and wherein the breathable film has a weight per unit area of less than about 35 g/m$^2$.

25. The breathable film of claim 24, wherein the calcium carbonate particles are prepared from calcium carbonate feedstock of sedimentary origin.

26. The breathable film of claim 24, wherein $D_{50}:D_{98}$ is at least 40:100.

27. The breathable film of claim 24, wherein $D_{20}$ is from 0.8 to 1.2 microns.

28. The breathable film of claim 24, wherein at least a portion of the particles are coated with an aliphatic carboxylic acid having at least 10 carbon atoms.

29. The breathable film of claim 24, wherein:
  at least a portion of the particles are coated with an aliphatic carboxylic acid comprising stearic acid, palmitic acid, behenic acid, montanic acid, capric acid, lauric acid, myristic acid, isostearic acid, a cerotic acid, or a mixture thereof; and
  the aliphatic carboxylic acid constitutes from 0.5% to 1.5% by weight of the particles.

30. The breathable film of claim 24, having a water vapor transmission rate of at least about 100 g/m$^2$ per 24 hours.

* * * * *